(12) United States Patent
Wang et al.

(10) Patent No.: US 7,676,521 B2
(45) Date of Patent: Mar. 9, 2010

(54) KEYWORD SEARCH VOLUME SEASONALITY FORECASTING ENGINE

(75) Inventors: Lee Wang, Kirkland, WA (US); Li Li, Issaquah, WA (US); Shuzhen Nong, Bellevue, WA (US); Ying Li, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 247 days.

(21) Appl. No.: 11/394,089

(22) Filed: Mar. 31, 2006

(65) Prior Publication Data

US 2007/0239703 A1 Oct. 11, 2007

(51) Int. Cl.
*G06F 17/30* (2006.01)
(52) U.S. Cl. ....................................... 707/751
(58) Field of Classification Search ................ None
See application file for complete search history.

(56) References Cited

U.S. PATENT DOCUMENTS

| | | | |
|---|---|---|---|
| 6,067,565 A | 5/2000 | Horvitz | |
| 6,606,615 B1 * | 8/2003 | Jennings et al. | 706/45 |
| 6,731,990 B1 * | 5/2004 | Carter et al. | 700/52 |
| 6,873,983 B2 * | 3/2005 | Ugai et al. | 707/6 |
| 6,963,867 B2 | 11/2005 | Ford et al. | |
| 7,369,961 B2 * | 5/2008 | Castelli et al. | 702/176 |
| 2002/0035643 A1 * | 3/2002 | Morita | 709/245 |
| 2002/0107735 A1 * | 8/2002 | Henkin et al. | 705/14 |
| 2002/0169762 A1 * | 11/2002 | Cardona | 707/3 |
| 2002/0184212 A1 * | 12/2002 | Ugai et al. | 707/6 |
| 2006/0235745 A1 * | 10/2006 | Yano | 705/14 |
| 2007/0027754 A1 * | 2/2007 | Collins et al. | 705/14 |
| 2007/0027761 A1 * | 2/2007 | Collins et al. | 705/14 |
| 2007/0027850 A1 * | 2/2007 | Chan et al. | 707/3 |
| 2007/0067267 A1 * | 3/2007 | Ives | 707/3 |
| 2007/0100875 A1 * | 5/2007 | Chi et al. | 707/102 |
| 2007/0124194 A1 * | 5/2007 | Barnette et al. | 705/10 |
| 2007/0150348 A1 * | 6/2007 | Hussain et al. | 705/14 |

FOREIGN PATENT DOCUMENTS

| | | |
|---|---|---|
| KR | 1020020003915 | 1/2002 |
| KR | 1020050074879 | 7/2005 |

OTHER PUBLICATIONS

Patent Cooperation Treaty, International Search Report and Written Opinion, Jul. 31, 2007.

* cited by examiner

*Primary Examiner*—Neveen Abel Jalil
*Assistant Examiner*—Bai D Vu
(74) *Attorney, Agent, or Firm*—Shook, Hardy & Bacon L.L.P.

(57) ABSTRACT

A method and system are provided for forecasting keyword search volume. Keywords are categorized by concept and by the amount of data available for use in predicting future behavior. The keywords and/or the categories can also be categorized as seasonal or non-seasonal. A category level seasonal variation pattern can then be calculated based on keywords in the category that have sufficient historical data. A search volume can then be predicted for one or more keywords, with an appropriate calculation algorithm being selected based on the concept category, seasonal classification, and historical data available for the keywords.

15 Claims, 7 Drawing Sheets

KEYWORD SEARCH VOLUME SEASONALITY FORECASTING ENGINE

CROSS-REFERENCE TO RELATED APPLICATIONS

None.

STATEMENT REGARDING FEDERALLY SPONSORED RESEARCH OR DEVELOPMENT

None.

BACKGROUND

Keyword searching is a convenient and effective method for shoppers to identify goods and services for sale on the Internet. As a result, advertisers have an interest in associating their products with search terms likely to appear in a keyword search query. Conventionally, the expected search volume for a given search term has been determined by accumulating data for multiple year time periods. This accumulated data can then be used to forecast an expected value. However, such conventional methods are time consuming and therefore impractical for general forecasting of all search terms. Additionally, many search terms of interest do not have meaningful usage data for the multiple years required for conventional forecasting.

BRIEF SUMMARY

In an embodiment, a system and method are provided for generating forecasts of keyword search volume. A seasonal correlation value is determined for a plurality of keywords. A forecast of a first type is then generated for keywords that have a seasonal correlation value greater than or equal to a predetermined threshold. Preferably, the first type of forecast represents a forecast capable of incorporating seasonal variations, such as an ARIMA forecast. A forecast of a second type is generated for other keywords that have a seasonal correlation value below the predetermined threshold. Preferably, the second type of forecast can be a simplified calculation, or even a forecast based on using the search volume from the previous month.

In another embodiment, a system and method are provided for generating forecasts of keyword search volume. First, one or more seasonal categories are provided. The provided seasonal categories can be concept categories that were originally identified manually, concept categories used by an on-line retailer for classifying goods and services, or categories selected in another manner. A category level seasonal variation pattern can be constructed for the one or more seasonal categories. A keyword can be assigned to one of the seasonal categories that has a category level seasonal variation pattern. After assigning the keyword to a concept category, the associated category level seasonal variation pattern for the category can be used as part of a calculation to generate a forecast of search volume for the keyword This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present invention is described in detail below with reference to the attached drawings figures, wherein.

DETAILED DESCRIPTION

In various embodiments, the invention is directed to a method and system for forecasting the search volume of search terms that have seasonal variations. In the description below, seasonal variations refer to fluctuations in keyword search volume that are based on trends that periodically repeat, such as on a yearly basis. A seasonal variation can represent a two week fluctuation, a one month fluctuation, a three month fluctuation, or a fluctuation on another time period that is convenient for measurement. In an embodiment, this can be accomplished by categorizing available search terms into various categories. These categories can correspond to seasonal and non-seasonal terms. For the seasonal categories, search terms that have longer usage histories of measured keyword search volumes can be used to build up or construct a seasonality pattern for the category. This category level seasonality pattern can then be used to assist in forecasting for search terms that do not have a sufficient usage history for conventional forecasting.

In another embodiment, the type of forecast generated for a term can vary depending on the categorization of the term as seasonal or non-seasonal. A correlation factor can be calculated for a term to determine the amount of correlation a term has that is due to seasonal considerations. If the correlation factor is above a predetermined threshold, a formula can be used to calculate a forecast value for the search volume of the term, with the formula taking into account seasonal considerations. If the correlation factor is below the predetermined threshold, a simpler method of forecasting can be used, such as basing the forecast value on the usage volume of the previous month.

The search volume for a search term or keyword can fluctuate widely due to seasonal variations. For example, the search volume for a keyword such as "best buy" could decrease nearly 50% from December to January on a search engine such as MSN Search. One way to account for or predict fluctuations in keyword search volume for a given month is by using a methodology such as Statistical Univariate Time Series algorithms. Statistical Univariate Time Series algorithms such as Auto-Regressive Integrated Moving Average (ARIMA) can be used to determine the seasonality pattern in a keyword search volume and predict their future values if there are enough historical data points. For example, an ARIMA model uses Maximum Likelihood Estimation to estimate the seasonality under the impact of auto-regression and moving average in the time series.

In an embodiment, the invention accommodates the intensive computation requirements of methods such as Statistical Univariate Time Series algorithms by only applying the computationally intensive methods on a subset of possible keywords. One method for identifying a subset of keywords for more detailed statistical analysis is by detecting seasonal correlations in historical data for a keyword.

Figure 1:
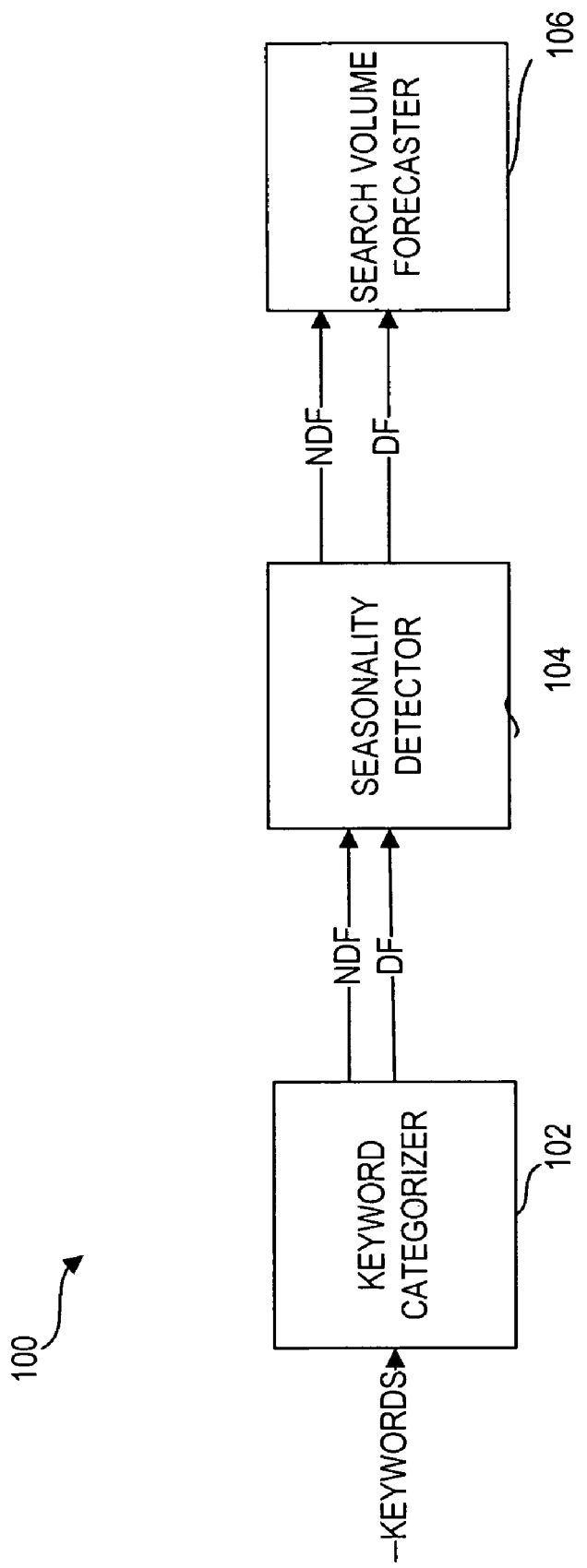
FIG. 1 is a block diagram illustrating details of a system in accordance with an embodiment of the invention.

FIG. 1 shows an exemplary system 100 embodiment of the invention. FIG. 1 illustrate the multiple components of the device having a keyword search volume forecasting engine including: a keyword categorizer 102; a seasonality detector 104; and a search volume forecaster 106. As shown in FIG. 1, the keyword categorizer 102 receive search keywords as input for processing. In response, the keyword categorizer 102 divides the keywords into categories such as directly forecastable and non-directly forecastable based on the number of historical data points. Directly forecastable(DF) keywords include keywords that can be directly forecasted using known time series algorithms. Non-Directly Forecastable keywords include keywords that cannot be directly forecasted using known time series algorithms. Once the search keywords are divided into categories of DF keywords and NDF keywords, the seasonality detector 104 calculates the category level seasonal variation pattern based on the category of the keywords. Using this calculation, the search volume forecaster 106 forecasts the search volume corresponding to the one or more keywords.

Keyword Search Volume Forecasting Engine

In an embodiment, the invention provides a device 100 having a keyword search volume forecasting engine. The device includes a keyword categorizer 102 to determine the category of one or more keywords based on historical data points; a seasonality detector 104 to calculate the category level variation seasonal variation pattern based on the category of the one or more keywords; and a search volume forecaster 106 to forecast the search volume corresponding to the one or more keywords. Additionally, the components of the device may be incorporated in a memory such as a RAM or other memory device.

In another embodiment, the keyword categorizer 102 determines the category of the one or more keywords based on historical data points, such as measured keyword search volumes. In one embodiment, the keyword categorizer 102 categorizes the keywords into directly forecastable (DF) and non-directly forecastable (NDF) categories. In another embodiment, the keyword categorizer 102 categorizes the keywords into directly forecastable if the historical data points corresponding to the keyword has more than two years of data points. Furthermore, if the keywords are classified as directly forecastable, the keyword categorizer 102 divides the DF keywords into seasonal and non-seasonal categories transmits the DF keywords to the seasonality detector 104 for further processing.

In still another embodiment, the seasonality detector 104 calculates the category level seasonal variation pattern (CLSVP) based on the category of the keywords transmitted by the keyword categorizer 102. In one embodiment, the seasonality detector 104 computes the category monthly variation for each category corresponding to the keywords. In another embodiment, the seasonality detector 104 processes and transmits the seasonal and non-seasonal keywords to the search volume forecaster 106.

In yet another embodiment, the search volume forecaster 106 forecasts the search volume corresponding to the one or more keywords. In such an embodiment, the search volume forecaster 106 forecasts monthly the search volume of seasonal directly forecastable keywords based on a seasonal variation pattern. Alternatively, the search volume forecaster 106 forecasts monthly the search volume of non-seasonal directly forecastable keywords based on the search volume of the previous month. Preferably, the seasonality variation pattern includes an ARIMA algorithm.

General Computing Environment

Figure 2:
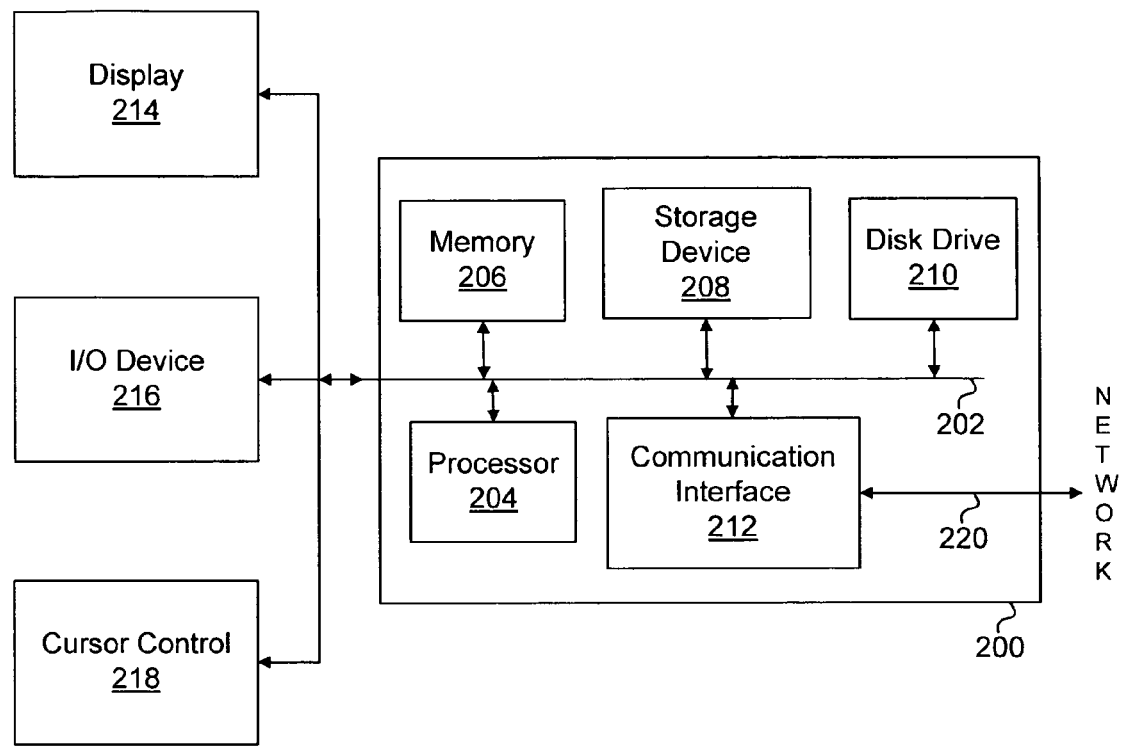
FIG. 2 schematically shows a computing environment for performing an embodiment of the invention.

FIG. 2 illustrates an example of a general computing system environment 200 suitable for performing forecasting of keyword search volume. The computing system environment 200 is only one example of a computing environment and is not intended to suggest any limitation as to the scope of use or functionality of the invention. Neither should the computing environment 200 be interpreted as having any dependency or requirement relating to any one or combination of components illustrated in the exemplary operating environment 200.

Various embodiments of the invention are described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

In the embodiment of a computing environment shown in FIG. 2, computer system 200 includes a bus 202 or other communication mechanism for communicating information, which interconnects subsystems and devices, such as processor 204, system memory 206 (e.g., RAM), storage device 208 (e.g., ROM), disk drive 210 (e.g., magnetic or optical), communication interface 212 (e.g., modem or Ethernet card), display 214 (e.g., CRT or LCD), input device 216 (e.g., keyboard), and cursor control 218 (e.g., mouse or trackball).

According to one embodiment of the invention, computer system 200 performs specific operations by processor 204 executing one or more sequences of one or more instructions contained in system memory 206. Such instructions may be read into system memory 206 from another computer readable medium, such as static storage device 208 or disk drive 210. In alternative embodiments, hard-wired circuitry may be used in place of or in combination with software instructions to implement the invention.

The term "computer readable medium" refers to any medium that participates in providing instructions to processor 204 for execution. Such a medium may take many forms, including but not limited to, non-volatile media and volatile media. Non-volatile media includes, for example, optical or magnetic disks, such as disk drive 210. Volatile media includes dynamic memory, such as system memory 206.

Common forms of computer readable media includes, for example, floppy disk, flexible disk, hard disk, magnetic tape, any other magnetic medium, CD-ROM, any other optical storage medium, any other physical medium with patterns of holes, RAM, PROM, EPROM, FLASH-EPROM, any other memory chip or cartridge, or any other storage medium from which a computer can read.

In an embodiment of the invention, execution of the sequences of instructions to practice the invention is performed by a single computer system 200. According to other embodiments of the invention, two or more computer systems 200 coupled by communication link 220 (e.g., LAN, PSTN, or wireless network) may perform the sequence of instructions to practice the invention in coordination with one another. Computer system 200 may transmit and receive messages, data, and instructions, including program, i.e., application code, through communication link 220 and communication interface 212. Received program code may be executed by processor 204 as it is received, and/or stored in disk drive 210, or other non-volatile storage for later execution.

Keyword Categorization

In various embodiments, several types of categorization can be performed to assist with determining an expected keyword search volume. One type of categorization is determining whether a search term or keyword is directly forecastable (DF) or non-directly forecastable (NDF). In an embodiment, a directly forecastable keyword is a keyword for which a sufficient amount of past data has been accumulated to allow for the use of a desired forecasting algorithm, such as an ARIMA algorithm. Preferably, the amount of past data available is two years of data or greater. A non-directly forecastable keyword is a keyword where insufficient data is available, either because the data is not available or because the data shows such a significant change in the usage pattern over time that the historical data is not trustworthy. For example, when a new video game is released, such as "Halo", the words in the title of the video game may represent keywords that have a previous search volume history. However, the search volume history prior to the release of the video game may not be relevant to a forecast made after the game is released. In this situation, a keyword can be designated as NDF even though historical data is potentially available.

A second type of categorization or classification is a categorization between seasonal and non-seasonal keywords. A seasonal keyword is a keyword with a search volume that is correlated with the search volume of the same time period (season) during the previous year. For example, a keyword that shows a significant search volume only during a single month would be a seasonal keyword. Other seasonal keywords could show increased activity during a two month period, a three month period, or during a specified multi-week period. Still other seasonal keywords could have season dependent correlations during all months and/or weeks of the year.

One way for determining whether a keyword is seasonal is by calculating a correlation factor for the keyword. For example, a Pearson correlation factor can be calculated for a keyword to identify potential seasonal correlation. A Pearson correlation factor can be calculated using the formula $$r = \frac{\sum_{t=1}^{12}((x_{1t} - \bar{x}_1) * (x_{2t} - \bar{x}_2))}{\sigma(x_1) * \sigma(x_2)}$$

where
r is the Pearson correlation factor;
$\chi_n$ is the average volume from a year;
$\chi_{nt}$ is the average volume from a month within a year;
t ranges from 1 to 12 to represent the months within a year; and
$\sigma(\chi)$ is the standard deviation for the data from year $\chi$.

In an embodiment where a seasonal correlation factor is calculated for a keyword, such as a Pearson correlation factor, a keyword is classified as a seasonal keyword if the correlation factor is greater than a threshold value. In an embodiment, the threshold for classifying a keyword as seasonal can be a Pearson correlation factor of 0.8 or higher. In another embodiment, the threshold can be determined empirically based on a test data set.

Figure 3:
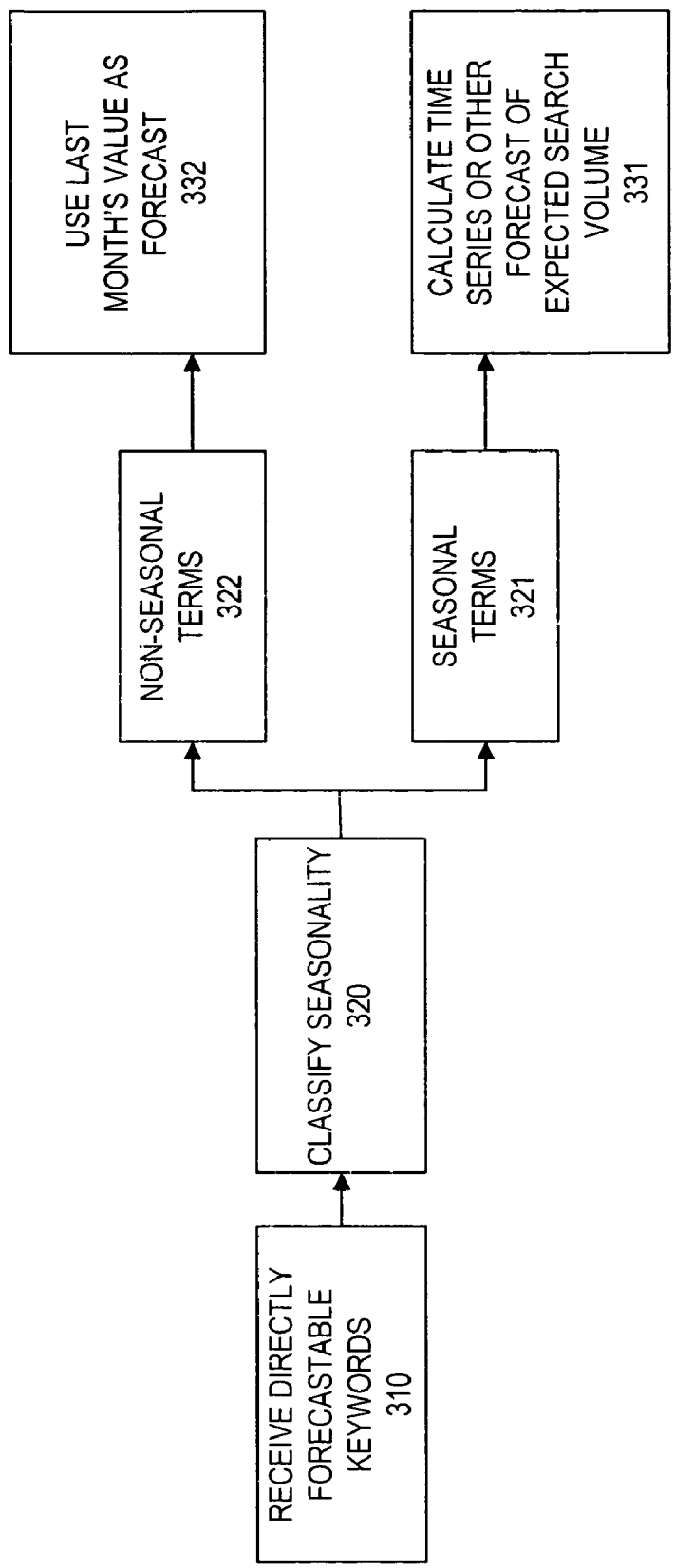
FIG. 3 is a flow chart illustrating a process in accordance with an embodiment of the invention.

FIG. 3 depicts a method for generating a forecast of search volume for directly forecastable terms according to an embodiment of the invention. In the embodiment shown in FIG. 3, the keywords have already been separated 310 into directly forecastable (DF) and non-directly forecastable (NDF) keywords. The embodiment shown in FIG. 3 focuses on forecasting for the DF keywords. First, the keywords are classified 320 as seasonal 321 or non-seasonal 322, such as by calculating a seasonal correlation factor. A forecast for the seasonal keywords 321 is generated 331 by using a statistical algorithm, such as the ARIMA algorithm. For the non-seasonal keywords 322, a forecast is generated 332 with less computational effort by using the search volume for the previous month as the forecast.

The above method determines keyword seasonality based on historical search volume data associated with a keyword. In another embodiment, however, some keywords (such as NDF category keywords) may not have sufficient historical data available to allow calculation of a seasonal correlation factor. In such an embodiment, a keyword can be classified as seasonal or not seasonal by grouping keywords into concept categories. For example, keywords could be assigned to concept categories such as video games, automobiles, medical, and other types of goods and services. The concept categories can be categories determined manually, or the concept categories could be determined by some type of data mining. In an embodiment, the concept categories can represent a previously determined group of categories, such as the categories used by an on-line retailer for classifying goods and services. Once the concept categories are established, keywords are assigned to the concept categories. The keywords assigned to a category are then analyzed to identify keywords (such as DF keywords) that have sufficient historical data to allow determination of seasonality. The seasonality (or lack thereof) of the keywords is then determined.

Based on the seasonality of the individual keywords, a determination is made as to whether the category represents a seasonal category. For example, if the majority of keywords in a category are seasonal, then the category can be designated as seasonal. In another embodiment, the search volume data for all DF keywords in the category could be aggregated and used to calculate a correlation factor. In such an embodiment, the category would be considered seasonal if the correlation factor was greater than a threshold value. If a category is designated as seasonal, an aggregate, category level seasonal variation pattern is determined for the category. Preferably, the pattern can be expressed as a series of multiplicative factors relative to the previous month, which can be referred to as a category monthly variation. For example, for a seasonal category that has an increase in search volume for the category near the end of the calendar year, the pattern could specify that the multiplicative factor for December relative to November is 1.5. If the search volume then drops off after the beginning of the new year, the multiplicative factor for January relative to December could be 0.4.

The category level seasonal variation pattern can be determined in a variety of manners, so long as a pattern is produced that quantitatively captures the seasonal behavior of the category, such as trends during the course of a year, or peaks or low periods For example, the seasonal variation for each DF keyword could be determined, and then the seasonal variation for each keyword could be averaged. The resulting pattern could then be analyzed to determine month-to-month multiplicative factors that reflect the trends, peaks, and valleys in the search volume behavior. In another embodiment, the averaging could be performed as a weighted average, with keywords that have a larger total historical search volume receiving greater weight in the average. In still other embodiments, other techniques for producing an aggregated, category level seasonal variation pattern could be used.

Figure 4:
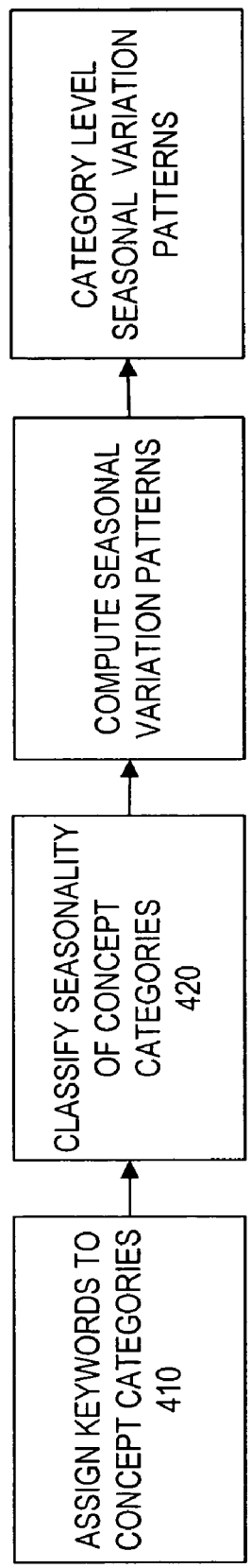
FIG. 4 is a flow chart illustrating another process in accordance with an embodiment of the invention.

FIG. 4 depicts a method for determining category level seasonal variation patterns for concept categories according to an embodiment of the invention. In the embodiment shown in FIG. 4, keywords are assigned 410 to concept categories. The categories are then classified 420 as seasonal or non-seasonal. After this determination, a seasonal variation patterns are calculated 430 for the seasonal categories, resulting in category level seasonal variation patterns 440.

Figure 5:
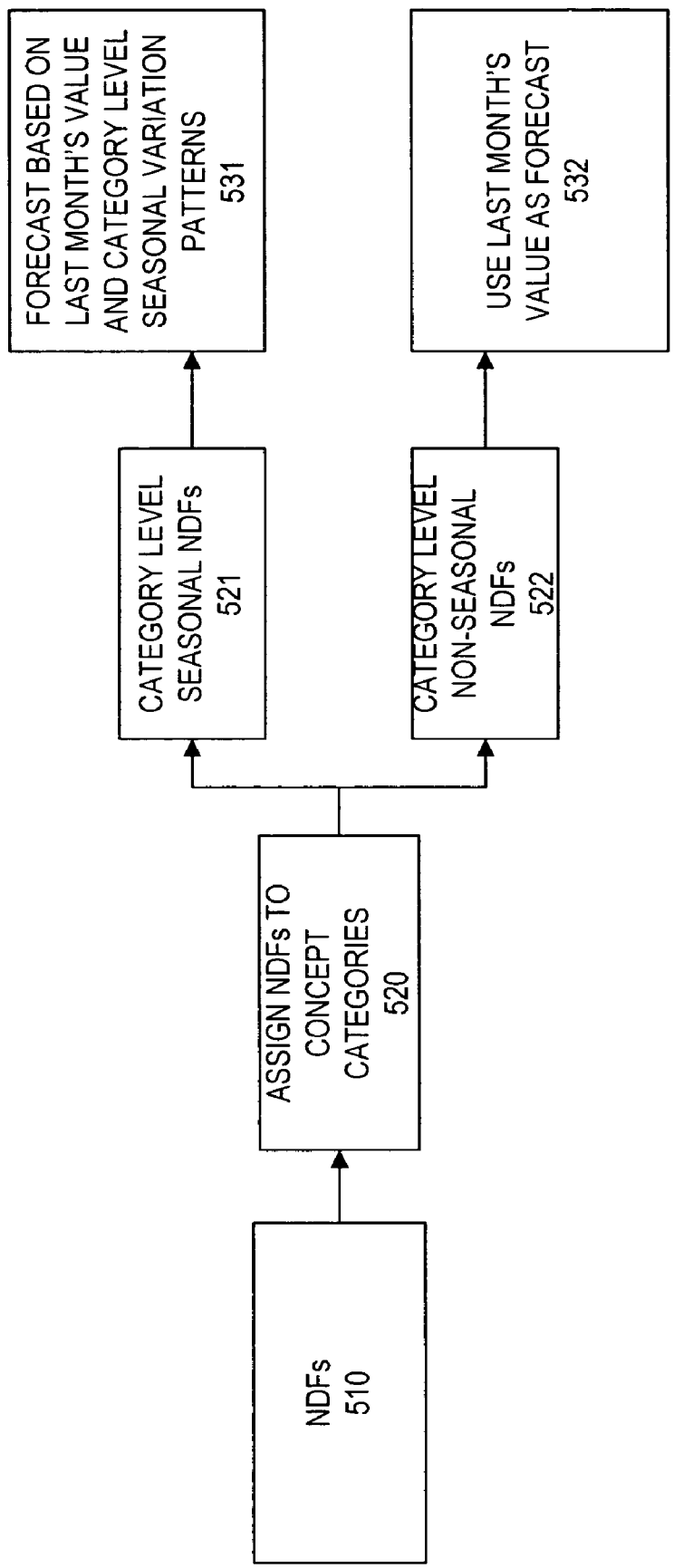
FIG. 5 is a flow chart illustrating another process in accordance with an embodiment of the invention.

After producing a category level seasonal variation pattern, a forecast of search volume can be generated for any NDF keywords assigned to a concept category (or other keywords that lack sufficient historical data for direct seasonality variation calculation). In an embodiment, a forecast can be generated for NDF keywords by starting with the previous month's search volume, and then modifying the forecast value based on the category level seasonal variation pattern, if any. FIG. 5 depicts an example of generating search volume forecasts for NDF keywords according to an embodiment of the invention. As in FIG. 3, the method begins with the NDF keywords already being identified 510 relative to the DF keywords. The NDF keywords are assigned 520 to concept categories. For the NDF keywords assigned to seasonal categories 521, a forecast is generated 531 based on both the previous month's search volume as well as any variation due to the category level seasonal variation pattern for the category. For the NDF keywords assigned to non-seasonal categories 522, the forecast is generated 532 based on the previous month's search volume.

Additional Exemplary Embodiments

Figure 6:
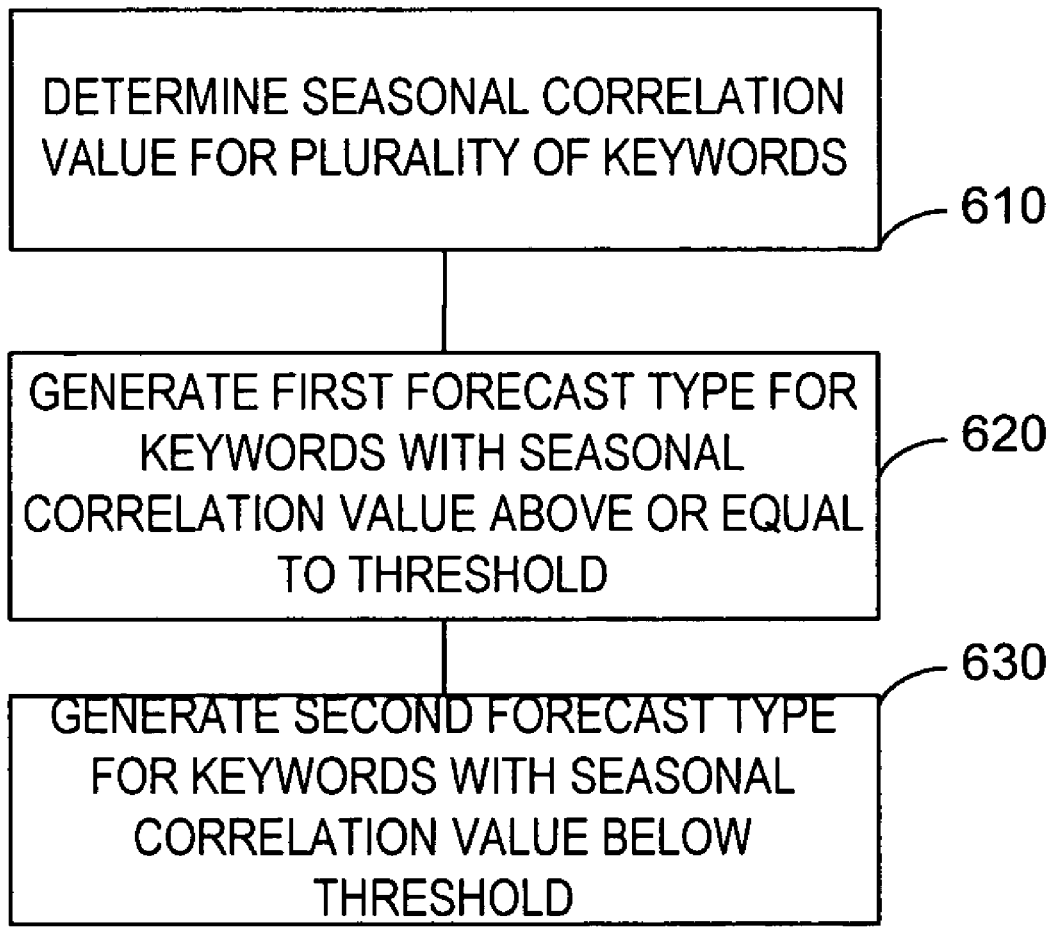
FIG. 6 is a flow chart illustrating another process in accordance with an embodiment of the invention.

FIG. 6 depicts a method for generating forecasts of keyword search volume according to an embodiment of the invention. In the embodiment shown in FIG. 6, a seasonal correlation value is determined 610 for a plurality of keywords. A forecast of a first type is then generated 620 for keywords that have a seasonal correlation value greater than or equal to a predetermined threshold. Preferably, the first type of forecast represents a forecast capable of incorporating seasonal variations, such as an ARIMA forecast. A forecast of a second type is generated 630 for other keywords that have a seasonal correlation value below the predetermined threshold. Preferably, the second type of forecast can be a simplified calculation, or even a forecast based on using the search volume from the previous month.

Figure 7:
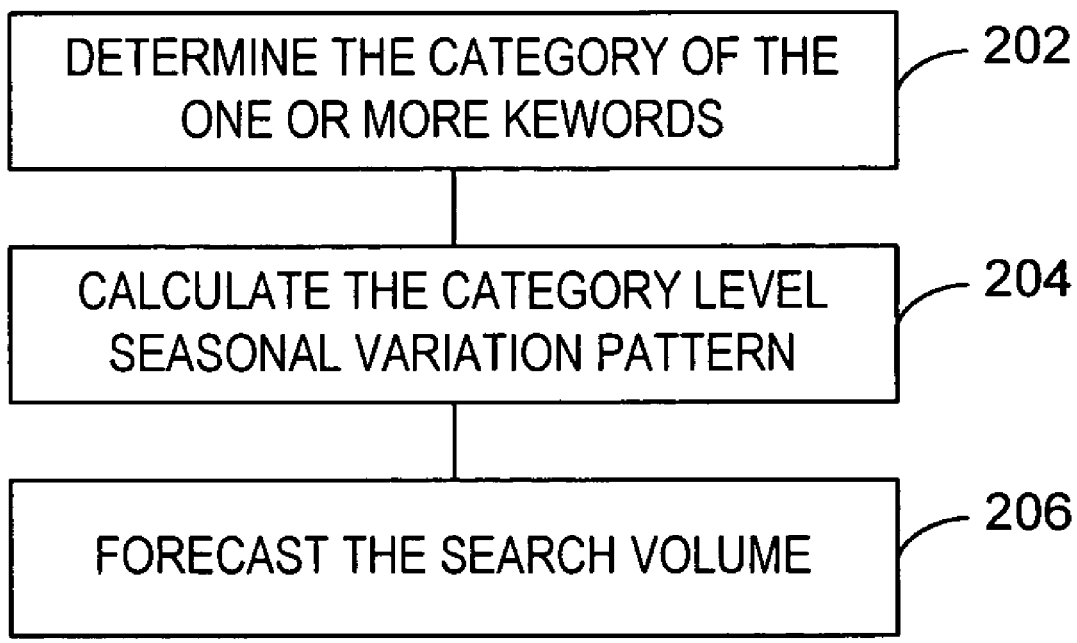
FIG. 7 is a flow chart illustrating another process in accordance with an embodiment of the invention.

FIG. 7 depicts another method for generating forecasts of keyword search volume according to an embodiment of the invention. In the embodiment shown in FIG. 7, one or more seasonal categories are provided 710. The provided seasonal categories can be concept categories that were originally identified manually, concept categories used by an on-line retailer for classifying goods and services, or categories selected in another manner. A category level seasonal variation pattern can be constructed 720 for the one or more seasonal categories. In step 730, a keyword can be assigned to one of the seasonal categories that has a category level seasonal variation pattern. After assigning the keyword to a concept category, the associated category level seasonal variation pattern for the category can be used as part of a calculation to generate 740 a forecast of search volume for the keyword.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

The invention claimed is:

1. One or more computer readable media having computer-executable instructions embodied thereon for performing a method for forecasting keyword search volume, comprising:
   providing one or more concept categories;
   constructing a category level seasonal variation pattern for each of the one or more concept categories, wherein seasonal variation refers to fluctuations in keyword search volume of one or more directly forecastable keywords included in the concept category based on trends that periodically repeat;
   identifying a seasonality of each of the one or more concept categories based on an associated category level seasonal variation pattern,
   assigning a non-directly forecastable keyword to a category selected from the one or more concept categories; and
   generating a forecast of keyword search volume for the non-directly forecastable keyword based on the seasonality of the assigned category, wherein the forecast is based on the category level seasonal variation pattern associated with the assigned category when the assigned category is identified as a seasonal category, and the forecast is based on a previous search volume associated with the assigned category when the assigned category is identified as a non-seasonal category.

2. The media of claim 1, wherein providing one or more concept categories further comprises:
   receiving a plurality of categories;
   calculating a seasonal correlation factor for each category; and
   designating one or more categories as seasonal, based on the value of the seasonal correlation factor.

3. The media of claim 1, wherein providing one or more concept categories further comprises:
   receiving a plurality of categories; and
   detecting the seasonality of each category.

4. The media of claim 1, wherein constructing the category level seasonal variation pattern further comprises computing a category monthly variation for each category corresponding to the keyword.

5. The media of claim 1, wherein generating a forecast of keyword search volume further comprises receiving a measured keyword search volume from a previous month.

6. The media of claim 4, wherein the category level seasonal variation pattern comprises one or more category monthly variations.

7. A method for forecasting keyword search volume performed by a computing device having a processor and memory, the method comprising:
   determining a seasonal correlation value for a plurality of directly forecastable keywords by calculating a Pearson correlation value, wherein the seasonal correlation value is a measure of a correlation between search volumes associated with the plurality of directly forecastable keywords and a seasonal trend in search volume;
   associating a non-directly forecastable keyword with the plurality of directly forecastable keywords;

generating a first forecast of keyword search volume for the non-directly forecastable keyword utilizing a first forecast type when the seasonal correlation value for the plurality of directly forecastable keywords has a value greater than or equal to a predetermined threshold; and generating a second forecast of keyword search volume for the non-directly forecastable keyword utilizing a second forecast type when the seasonal correlation value for the plurality of directly forecastable keywords has value below the predetermined threshold.

8. The method of claim 7, wherein the seasonal correlation value is based on a monthly correlation of keyword search volumes.

9. The method of claim 7, wherein the predetermined threshold is 0.8.

10. The method of claim 7, wherein generating the first forecast comprises generating a forecast using a statistical univariate time series algorithm.

11. The method of claim 7, wherein generating the second forecast comprises using a previously measured search volume as the forecast search volume.

12. A keyword search volume forecasting system having a processor and system memory for forecasting keyword search volume, the system comprising:

keyword categorizer to determine a forecastability category of a keyword based on measured keyword search volumes, wherein the keyword categorizer categorizes keywords into directly forecastable and non-directly forecastable categories, and wherein a directly forecastable keyword is associated with at least a predefined amount of accumulated historical search volume data and a non-directly forecastable keyword is associated with less than the predefined amount of accumulated historical search volume data;

a seasonality detector to detect a seasonality of keywords and keyword categories, wherein the seasonality is based on trends identified from historical search volume data associated with the the directly forecastable keywords, wherein the seasonality of each non-directly forecastable keyword is determined based on the seasonality of one or more directly forecastable keywords with which the non-directly forecastable keyword is associated; and a forecasting engine to forecast a keyword search volume corresponding to the non-directly forecastable keyword, wherein the forecasted search volume for the non-directly forecastable keyword is based at least on the seasonality and one or more of the historical search volume data of the non-directly forecastable keyword and the historical search volume data of the one or more directly forecastable keywords with which the non-directly forecastable keyword is associated.

13. The forecasting system of claim 12, wherein the seasonality detector classifies keywords as seasonal and non-seasonal.

14. The forecasting system of claim 12, wherein the seasonality detector further comprises a calculation engine for determining a category level seasonal variation pattern for a keyword category.

15. The forecasting system of claim 12, wherein the forecasting engine generates a forecast based on an ARIMA (Auto Regressive Integrated Moving Average) algorithm.

* * * * *